United States Patent [19]

Ishida, Hiroshi et al.

[11] 4,448,519
[45] May 15, 1984

[54] IMAGE FORMING APPARATUS

[75] Inventors: Ishida, Hiroshi; Takaichi Kitagawa; Yasuji Sumida; Satoshi Nanba; Toshikazu Tomi, all of Osaka, Japan

[73] Assignee: Mita Industrial Company Limited, Osaka, Japan

[21] Appl. No.: 388,734

[22] Filed: Jun. 15, 1982

[30] Foreign Application Priority Data

Jun. 19, 1981 [JP] Japan ................................ 56-95436

[51] Int. Cl.³ ............................................. G03B 27/60
[52] U.S. Cl. ......................................... 355/73; 355/76
[58] Field of Search ............................... 355/73, 76, 25

[56] References Cited

U.S. PATENT DOCUMENTS 3,068,749 12/1962 Anander ................................ 355/73

Primary Examiner—Monroe H. Hayes
Attorney, Agent, or Firm—Wenderoth, Lind & Ponack

[57] ABSTRACT

An image forming apparatus is so arranged as to form an image of an original document on a photosensitive member by accommodating the plate-like photosensitive member of a rectangular or square configuration placed on an exposure section base in a housing of the image forming apparatus. The exposure section base is disengageable from the housing in a horizontal direction and has a plurality of suction holes in a region on which the photosensitive member is placed. A switch detects when the exposure section base is inserted into the housing to reach a predetermined position, and a suction device then sucks air through the suction holes.

4 Claims, 10 Drawing Figures

IMAGE FORMING APPARATUS

BACKGROUND OF THE INVENTION

1. Field of the Invention

The present invention relates to an image forming apparatus which is so arranged as to form images of original documents on a photosensitive member or photoreceptor (referred to as a photosensitive member hereinbelow) by accommodating the plate-like photosensitive member of a rectangular or square configuration placed on an exposure section base in a housing of the image forming apparatus.

2. Description of the Prior Art

In a prior art apparatus of this kind conventionally proposed, the arrangement has been such that, for mounting a photosensitive member in a housing of the image forming apparatus, the photosensitive member is placed on an exposure section base withdrawn from the apparatus housing and subsequently, the exposure section base is inserted back into the apparatus housing for accommodation thereof in said apparatus housing. In the known arrangement as described above, however, there have been such problems that, during accommodation of the exposure section base into the apparatus housing, relative positions of the exposure section base and the photosensitive member placed thereon are undesirably deviated by impacts, shocks or the like, with a consequent positional deviation of the image of the original document to be formed on the photosensitive member during exposure, with respect to the surface of said photosensitive member, and also that the four corner portions of the photosensitive member tend to be curved upwardly during mounting of the photosensitive member onto the exposure section base, thus resulting in uneven charging, without presenting clear and definite images of the original documents as desired.

Accordingly, it is a primary object of the present invention to provide an improved image forming apparatus which is particularly so arranged as to prevent deviations in the relative positions between the exposure section base and the photosensitive member placed on said exposure section base during selective insertion or withdrawal of the exposure section base into or from the apparatus housing.

SUMMARY OF THE INVENTION

To accomplish the foregoing object, there is provided an image forming apparatus which comprises an exposure section base onto which a plate-like photosensitive member of a rectangular or square configuration is placed and which is disengageable from a housing in a horizontal direction; switching means for detecting when the exposure section base has been inserted into the housing to reach a predetermined position; and a suction means for sucking air through suction holes formed in the exposure section base when the switching means detects such position of the exposure section base.

According to the present invention, when the exposure section base with the photosensitive member placed thereon is accommodated into the housing, the photosensitive member is adhered to the exposure section base by suction through the suction holes formed in the exposure section base, and therefore deviation of the photosensitive member due to impacts or shocks caused by the exposure section base being moved or being positioned at a suitable position may be positively prevented.

According to a preferred embodiment of the invention, the exposure section base has a plurality of suction holes at the four corner portions to provide a greater degree of opening per unit area as compared with other portions, and the four corner portions of the photosensitive member thus are adhered to the exposure section base securely.

The suction means comprises a suction fan and a suction duct. The suction duct is capable of being inserted into a space of the exposure section base through a guide duct, connected to a suction port of the suction fan, and extends toward the exposure section base.

Furthermore, the switching means is provided in the vicinity of the end of the suction duct, and the switching mode of the switching means alters when the suction duct begins to be inserted into the guide duct.

BRIEF DESCRIPTION OF THE DRAWINGS

A detailed description of the invention will be made with reference to the accompanying drawings, wherein like numerals designate corresponding elements in the figures, and wherein.

DETAILED DESCRIPTION OF THE PREFERRED EMBODIMENTS

Figure 1:
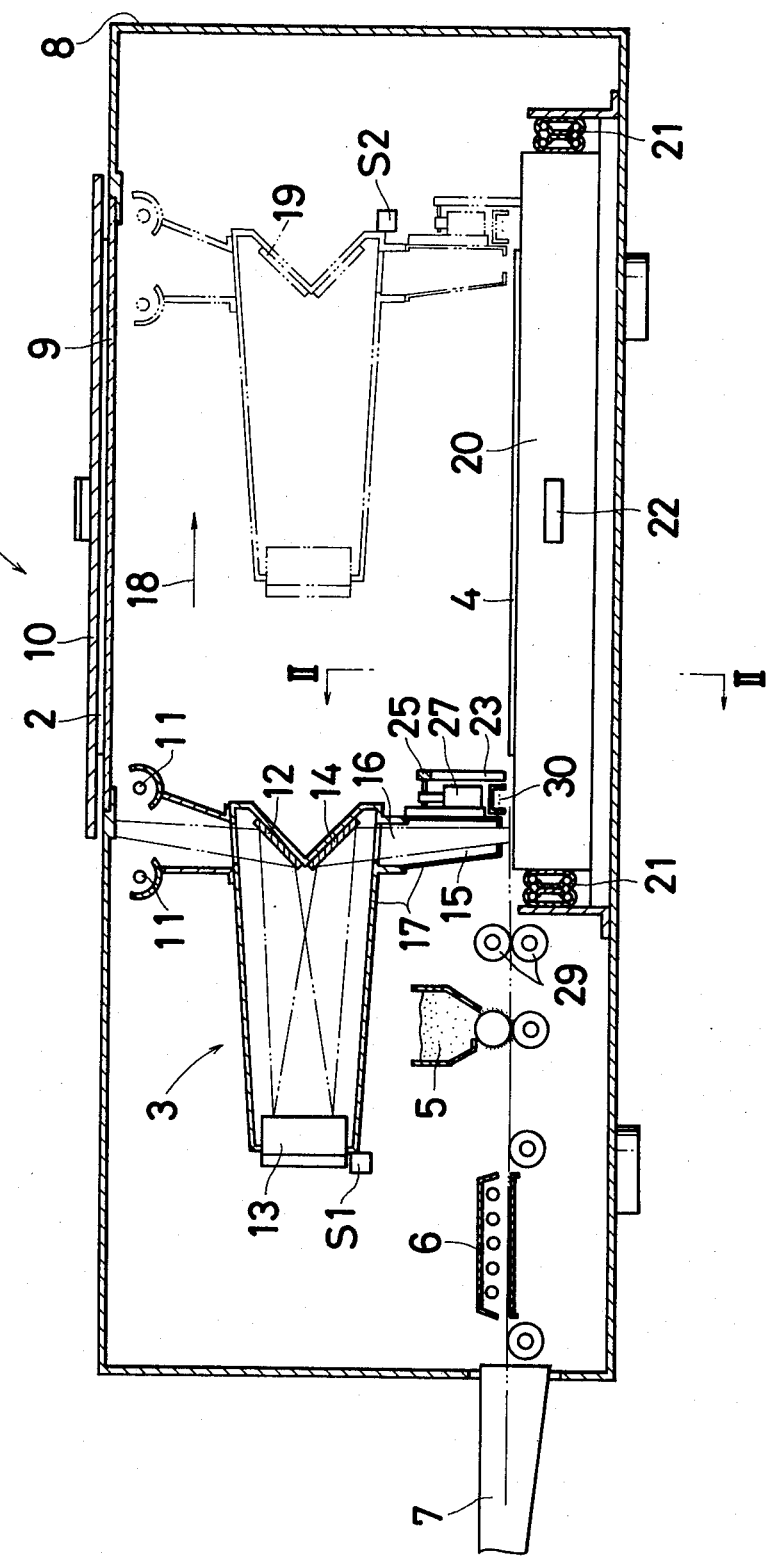
FIG. 1 is a longitudinal sectional view of an image forming apparatus.

Referring now to the drawings, there is shown in FIG. 1 a longitudinal sectional view of an image forming apparatus according to a preferred embodiment of the present invention. The image forming apparatus 1 is generally arranged to function in such a manner that a light image of an original document 2 is formed on a flat plate-like photosensitive member 4 through an optical system 3 to form an electrostatic latent image of the original document 2 on said photosensitive member 4, while the electrostatic latent image thus formed is developed by a developing device 5 into a visible toner image, which is subsequently fixed by a heat fixing device 6 so as to be discharged onto a tray 7 provided at the left hand side of an apparatus housing 8 in FIG. 1. More specifically, at an upper portion of the housing 8 of the image forming apparatus 1, there is fixedly provided a transparent plate 9, on which the original document 2 is placed. The original document 2 is pressed against the upper surface of the transparent plate 9 by an original document presser cover plate 10 as shown. Below and adjacent to the transparent plate 9, there is movably disposed the optical system 3, which includes a support member 17 having a set of exposure lamps 11 directed upwardly therefrom towards the transparent plate 9 for projecting light onto the original document 2 through said transparent plate 9. The support member 17 is further provided therein with a reflecting mirror 12, an in-mirror lens 13, another reflecting mirror 14, and an exposure amount adjusting device 15, all of which are fixed to the support member 17 as one unit. Accordingly, the light image of the original document 2 is directed, through the mirror 12, mirror lens 13, mirror 14 and a light path 16 formed in the exposure amount adjusting device 15, onto the surface of the photosensitive member 4 to form thereon the electrostatic latent image of the original document 2. The support member 17 having the construction as described above is arranged to be horizontally displaced by a driving source (not shown) during slit exposure in a direction indicated by an arrow 18 from a rest position shown by solid lines in FIG. 1 up to an end portion of the exposure moving direction of the arrow 18, as shown by imaginary lines 19, and upon termination of the exposure, to be moved in a direction opposite to the exposure moving direction of the arrow 18 so as to be returned back to the original rest position.

The photosensitive member 4 is to be placed on an exposure section base 20, which is arranged to be withdrawn towards a front portion of the apparatus housing 8, i.e. in a direction transverse to the paper surface in FIG. 1 by a pair of rail members 21 provided at opposite sides thereof. The base 20 is further provided with a handle portion 22 to be held by hand during selective insertion or withdrawal thereof.

The support member 17 has a corona charger 30 provided adjacent to the exposure amount adjusting device 15 thereof for charging the photosensitive member 4 prior to exposure.

Figure 2:
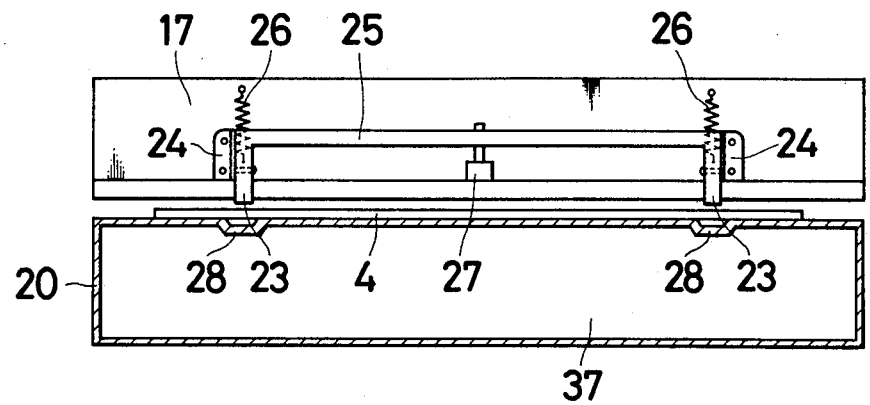
FIG. 2 is a sectional view taken along the line II-II of FIG. 1.

Reference is made to FIG. 2 showing a schematic side sectional view taken along the line II—II of FIG. 1. At the end portion of the support member 17 directed towards the exposure moving direction 18 thereof, a pair of feeding claws 23 spaced in a direction perpendicular to the exposure moving direction 18 (i.e. in a direction normal to the paper surface in FIG. 1 or in a lateral direction in FIG. 2) are guided by a corresponding pair of guide pieces 24 so as to be selectively raised or lowered for being spaced from or approaching the exposure section base 20. These feeding claws 23 are fixed to a connecting member 25, and normally are urged in a direction to be spaced from the exposure section base 20, i.e. in an upward direction in FIGS. 1 and 2 by corresponding spring members 26 (FIG. 2) connected between the claws 23 and a frame of the support member 17. Meanwhile, the connecting member 25 as described above is coupled with an electromagnetic solenoid 27 at its central portion. In the state as shown in FIG. 2 where the solenoid 27 is not energized, the feeding claws 23 are spaced from the photosensitive member 4 so as to be located above said member 4. On the other hand, in the exposure section base 20, there are formed recesses or grooves 28 extending in the exposure moving direction 18 at positions immediately below the feeding claws 23.

Figure 3:
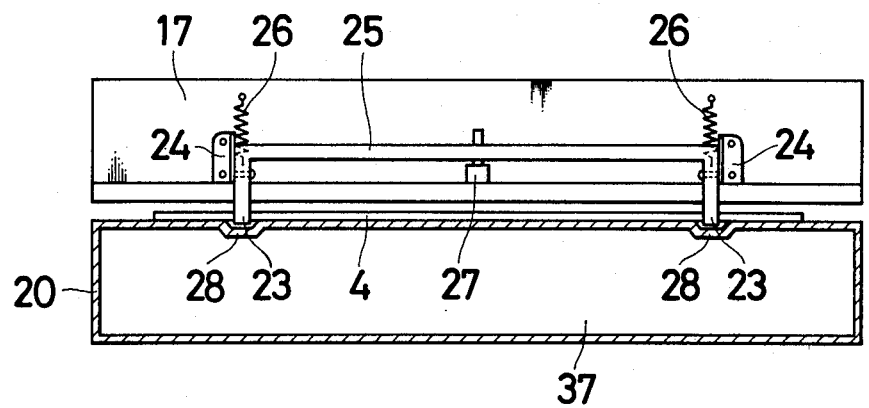
FIG. 3 is a view similar to FIG. 2, illustrating another condition.

After the support member 17 has moved in the exposure moving direction 18 and reached the end position 19 as shown by the imaginary lines in FIG. 1, the electromagnetic solenoid 27 is energized or excited, thus causing the feeding claws 23 to be fitted into the corresponding grooves 28 as shown in FIG. 3. When the support member 17 is moved towards the rest position in the direction opposite to the exposure moving direction 18 under the state as shown in FIG. 3, the feeding claws 23 feed the photosensitive member 4 towards the developing device 5 by pushing said member 4 on the exposure section base 20. At a position between the exposure section base 20 and the developing device 5 in FIG. 1, there are provided a pair of transport rollers 29 for holding the photosensitive member 4 under pressure therebetween for transportation thereof. Accordingly, when the photosensitive member 4 is fed by the feeding claws 23 up to a position where its leading edge is held between the transport rollers 29, said photosensitive member 4 is transported towards the developing device 5 by said transport rollers 29. After the electrostatic latent image has been developed into the visible toner image by the developing device 5, the toner image is thermally fixed, by the heat fixing device 6 as described earlier, onto the photosensitive member 4 which is subsequently discharged onto the tray 7.

Figure 4:
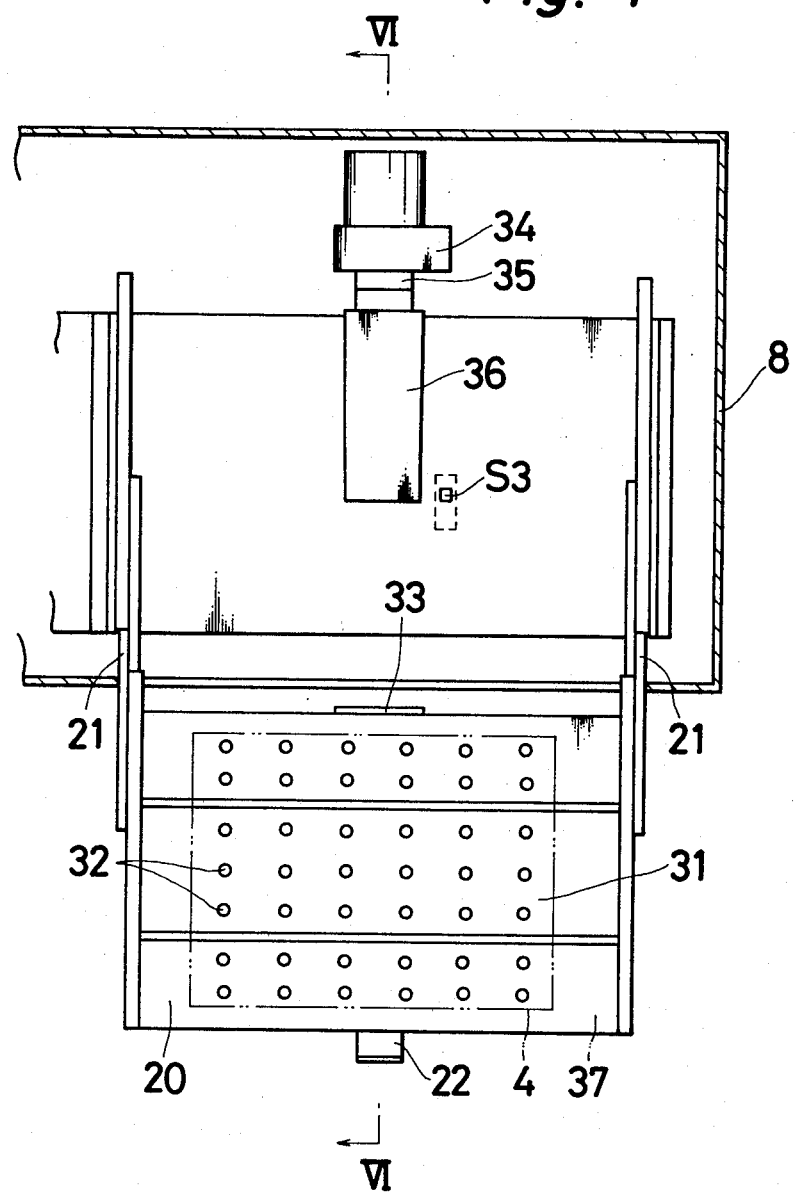
FIG. 4 is a horizontal sectional view in the state where an exposure section base has been withdrawn from an apparatus housing.
Figure 5:
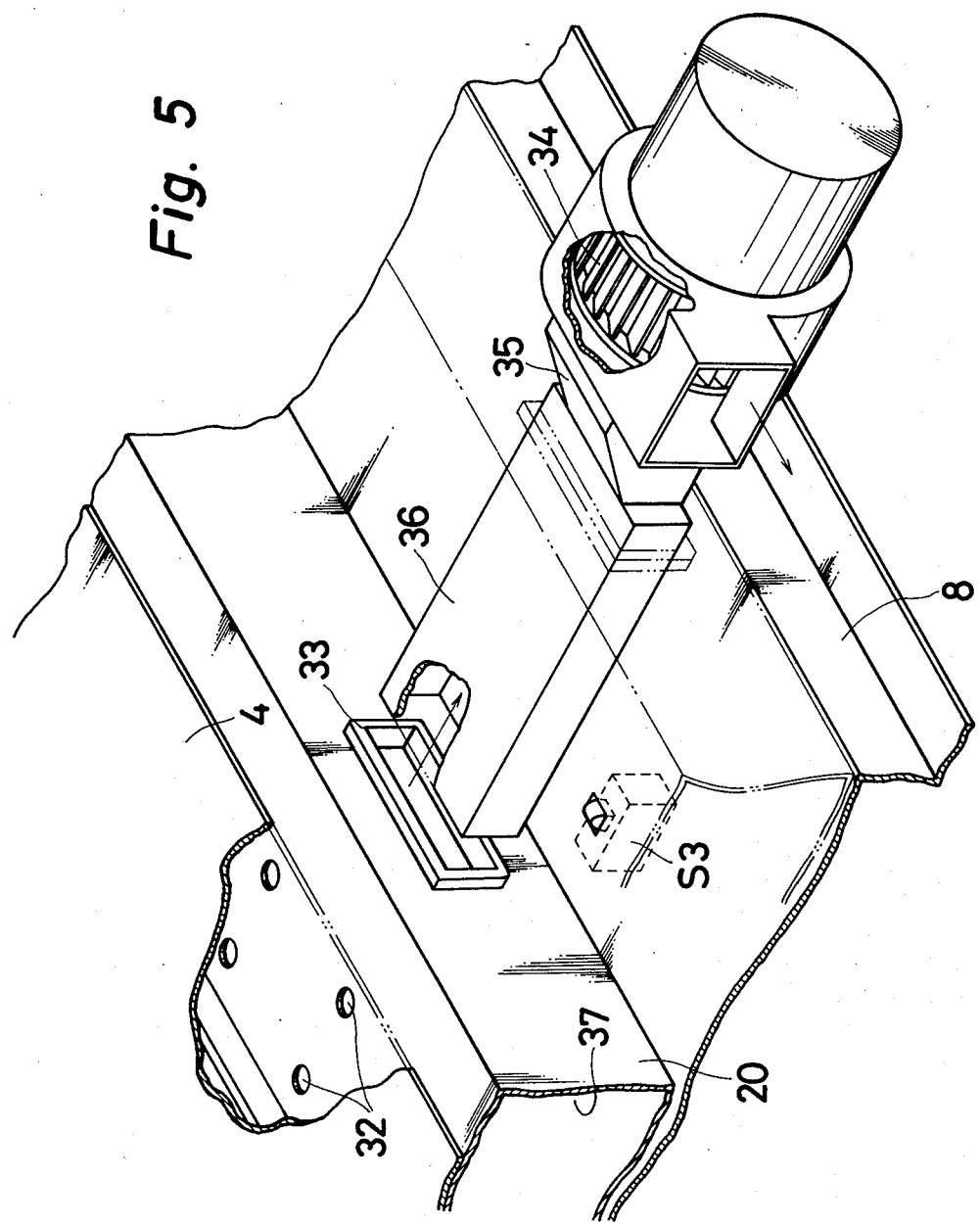
FIG. 5 is a perspective view, partly broken away, in the vicinity of a rear portion of the exposure section base.
Figure 6:
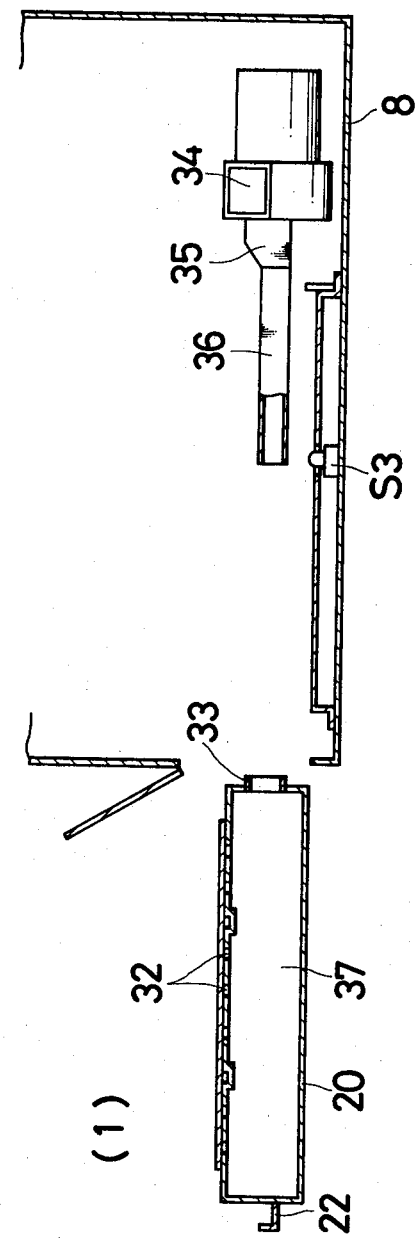
FIG. 6(1) to FIG. 6(3) are longitudinal sectional views taken along the line VI—VI of FIG. 4 illustrating respective functioning positions of the exposure section base.
Figure 6:
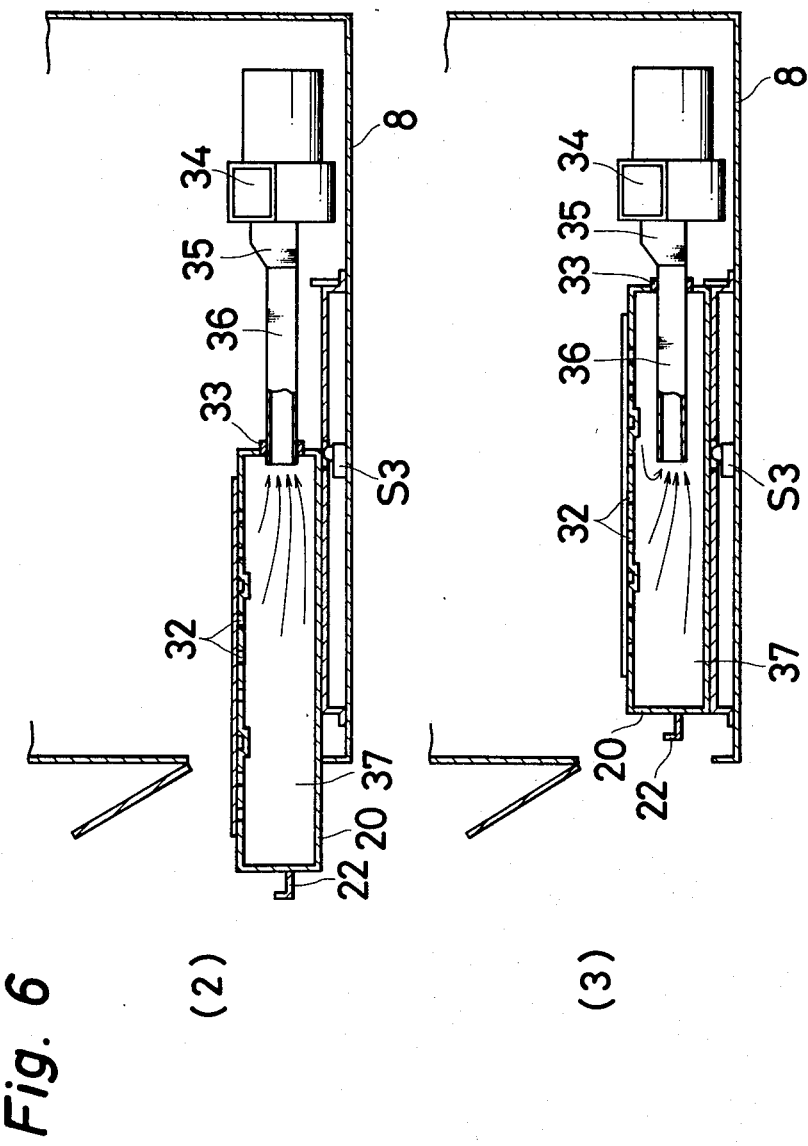

Reference is further made to FIG. 4 showing a horizontal sectional view in the state where the exposure section base 20 has been withdrawn from the apparatus housing 8, and to FIG. 5 showing a perspective view, partly broken away, in the vicinity of a rear portion of the exposure section base 20, and also to FIGS. 6(1) to 6(3) each showing a longitudinal sectional view taken along the line VI—VI of FIG. 4 for illustrating respective functioning positions of the exposure section base 20. The exposure section base 20 is formed into a cubic box-like configuration having a space 37 formed therein. The exposure section base 20 is also formed with a plurality of rows of suction holes 32 in its upper surface or upper region 31, on which the photosensitive member 4 is to be placed, while, to the rear portion of said base 20, there is secured a guide duct 33 which is communicated with the inner space 37 of the base 20.

On the other hand, within the apparatus housing 8, at a position posterior to the mounting position of the exposure section base 20 (i.e. in an upper position in FIG. 4 and at the right hand side in FIG. 6), there is provided a suction fan 34, which is connected, at its suction port 35, to a suction duct 36 extending towards the exposure section base 20. The suction duct 36 is arranged to be selectively inserted into or withdrawn from the inner space 37 of the base 20 through the guide duct 33. The apparatus housing 8 into which the exposure section base 20 may be partially or entirely inserted is provided, at its bottom portion, with a third switch means S3. This switch means S3 is arranged to be closed in the state of FIG. 6(2) where the exposure section base 20 is partially inserted, and to have already been closed in the state of FIG. 6(3) in which the suction duct 36 has been substantially fitted into the guide duct 33.

Moreover, in order to detect that the support member 17 is located at the rest position as indicated by the solid lines in FIG. 1, there is also provided a first switch means S1 at the left hand side of the apparatus housing 8 in FIG. 1. Furthermore, for detection that the support member 17 has reached the end position of the exposure moving direction 18, i.e. the position indicated by the imaginary lines 19 in FIG. 1, another switch means S2 is provided at the right hand side of the apparatus housing 8 as shown in FIG. 1. These switch means S1, S2 and S3 as described above are connected with one another as shown in FIG. 7.

Figure 7:
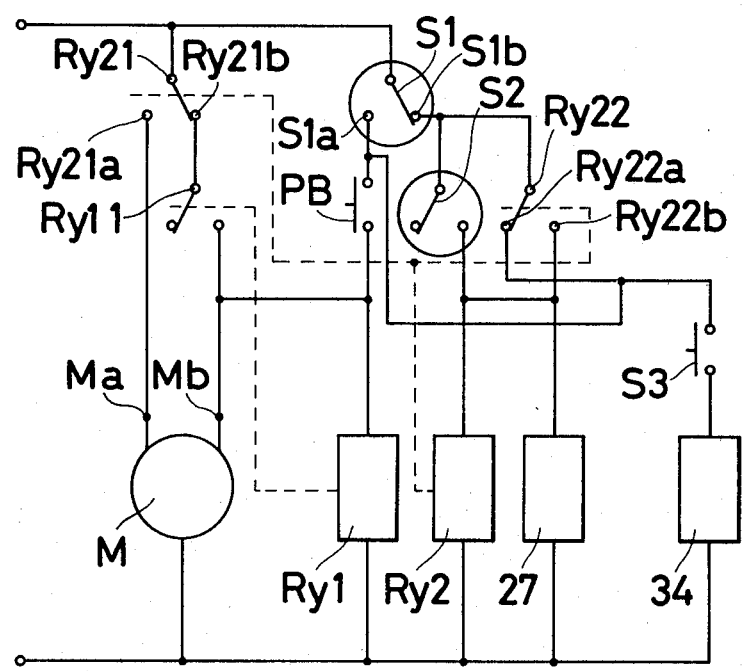
FIG. 7 is an electrical circuit diagram relating to a suction fan.

Referring also to an electrical circuit diagram of FIG. 7, a normally open contact Ry21a for a contact Ry21 of a second relay Ry2 is connected to a reverse rotation terminal Ma of a driving motor M capable of rotating in forward and reverse directions for displacing the support member 17 in the exposure moving direction 18 and in the direction opposite thereto, while a normally closed contact Ry21b for the contacts Ry21 of the second relay Ry2 is connected to a forward rotation terminal Mb of the driving motor M through a normally open contact for a contact Ry11 of a first relay Ry1. A normally open contact S1a of the first switch means S1 is coupled to the first relay Ry1 through a start switch PB, and a junction between the start switch PB and the first relay Ry1 is connected to a junction between the normally open contact for the contact Ry11 of the first relay Ry1 and the forward rotation terminal Mb of the driving motor M. Meanwhile, the normally closed contact S1b of the first switch means S1 is coupled to the second relay Ry2 through the second switch means S2 and the normally open contact of the second switch means S2. The normally closed contact S1b of the first switch means S1 is connected to the electromagnetic solenoid 27 through the normally open contact Ry22b for the contact Ry22 of the second relay Ry2, while a junction between the normally open contact of the second switch means S2 and the second relay Ry2 is connected to a junction between the normally open contact Ry22b for the contact Ry22 of the second relay Ry2 and the electromagnetic solenoid 27. The suction fan 34 and the third switch means S3 are connected in series to each other, and this third switch means S3 is coupled to the normally closed contact Ry22a for the contact Ry22 of the second relay Ry2 and the normally open contact S1a of the first switch means S1.

In the case where the support member 17 is located at the rest position as indicated by the solid lines in Fig. 1, the change-over has been effected to the normally open contact S1a of the first switch means S1. In the above state, the second switch means S2 is cut off, with the second relay Ry2 being de-energized, and thus, the contact Ry22 of the second relay Ry2 is conducted to the normally closed contact Ry22a thereof. In the state where the exposure section base 20 has been drawn out of the apparatus housing 8 as shown in FIG. 4 and FIG. 6(1), the third switch means S3 is kept cut off, and therefore, the suction fan 34 is in the de-energized state. When the photosensitive member 4 is placed on the region 31 at the upper portion of the exposure section base 20 withdrawn from the apparatus housing 8, and the base 20 is gradually inserted into the apparatus housing 8 as shown in FIG. 6(2), with the suction duct 36 inserted into the guide duct 33 for conducting or actuating the third switch means S3, the suction fan 34 is energized. Therefore, negative pressure is built up in the inner space 37 of the exposure section base 20, and thus, the photosensitive member 4 is kept attracted onto the exposure section base 20. By the above arrangement, even upon completion of mounting of the exposure section base 20 into the apparatus housing 8 as shown in FIG. 6(3), the suction fan 34 still remains energized, and therefore, deviation of the photosensitive member 4 with respect to the surface of the exposure section base 20 due to impacts, shocks, etc. can be advantageously prevented.

By the above arrangement, upon depression of the start switch PB for the image formation, current is fed to the driving motor M from the forward rotation terminal Mb thereof through the normally open contact S1a of the first switch means S1 and the start switch PB. In the manner as described above, the driving motor M is driven in the forward direction, while the first relay Ry1 is energized, with the contact Ry11 thereof conducted. Thus, the first relay Ry1 is self-retained, and the support member 17 is displaced in the exposure moving direction 18 by the driving of the driving motor M, whereby the first switch means S1 is restored back to the side of the normally closed contact S1b thereof.

Subsequently, upon arrival of the support member 17 at the terminating position of the exposure image forming process as shown by the imaginary lines 19 in FIG. 1, the second switch means S2 is rendered conductive, and thus, the second relay Ry2 is energized through the normally closed contact S1b of the first switch means S1 so as to render its contact Ry22 conductive for self-retaining of the second relay Ry2 and also for actuation of the electromagnetic solenoid 27. By the above functioning, the feeding claws 23 are displaced downwards, while the driving motor M is subjected to reverse drive through the change-over of the contact Ry21 of the second relay Ry2, and at this time, the suction fan 34 is de-energized.

By the reverse driving of the driving motor M, the support member 17 is moved in the direction opposite to the exposure moving direction 18, and accordingly, the photosensitive member 4 is moved on the exposure section base 20, while being pushed towards the developing device 5. When the support member 17 has been returned back to the rest position, the second relay Ry2 and the electromagnetic solenoid 27 are released from energization through the change-over of the first switch means S1, and the feeding claws 23 are displaced upwardly by the spring force of the spring members 26, while the driving motor M is stopped through the change-over of the contact Ry21 of the second relay Ry2 so as to bring the state back to the original condition.

Figure 8:
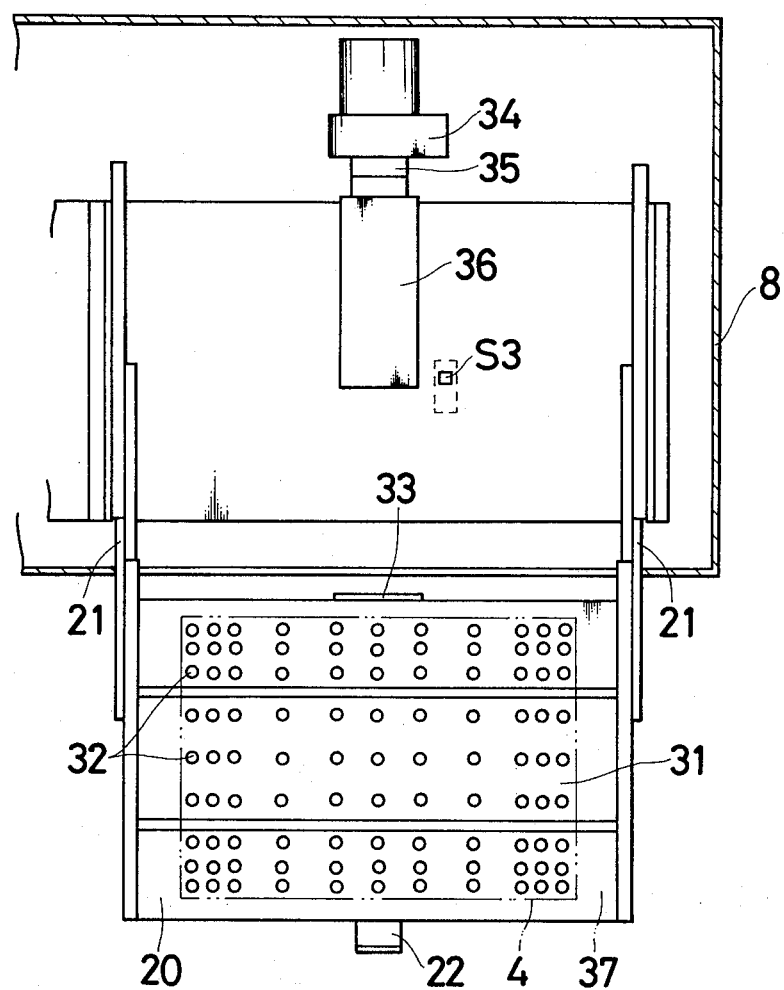
FIG. 8 is a sectional view similar to FIG. 4, showing another embodiment of the invention.

Referring further to FIG. 8, there is shown a horizontal sectional view similar to FIG. 4, but particularly showing another embodiment according to the present invention, in which parts corresponding to those in the previous embodiment are represented by like reference numerals and symbols.

In the embodiment of FIG. 8, there are also formed a plurality of rows of suction holes 32 in the upper region 31 of the exposure section base 20 on which the photosensitive member 4 is to be placed. The suction holes 32 in the embodiment of FIG. 8, however, are arranged to be formed, at the four corner portions of the upper region 31, so as to be larger in the number thereof per unit area than that in other parts of said upper region 31. To the rear portion of the exposure section base 20, the guide duct 33 is secured in a manner similar to that in the previous embodiment. In the above arrangement of FIG. 8, since the larger number of suction holes 32 are provided at the four corner portions of the upper region 31 to provide a greater opening degree per unit area as compared with other portions of said upper region 31, there is no possibility that the four corner portions of the photosensitive member 4 are undesirably curved upwardly when placed on the upper region 31, and furthermore, deviation of the photosensitive member 4 due to impacts, shocks, etc. may be positively prevented. Moreover, by the arrangement of FIG. 8, it becomes possible to positively attract the photosensitive member 4 onto the exposure section base 20 by a suction fan 34 with a comparatively small capacity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image forming apparatus comprising:

an exposure section base movable in a horizontal direction to be inserted into and removed from a housing, said exposure section base having a plurality of suction holes in a region on which a plate-like photosensitive member of a rectangular or square configuration is placed, switching means for detecting when said exposure section base has been inserted into the housing to reach a predetermined position, and suction means for sucking air through said suction holes when said switching means detects that said exposure section base has reached said predetermined position.

2. The image forming apparatus as claimed in claim 1, wherein said exposure section base has in four corner portions thereof a plurality of suction holes to provide a greater degree of opening per unit area than other portions of said exposure section base.

3. The image forming apparatus as claimed in claim 1, wherein said suction means comprises a suction fan and a suction duct capable of being inserted into a space of said exposure section base through a guide duct, said suction duct being connected to a suction port of said suction fan and extending toward said exposure section base.

4. The image forming apparatus as claimed in claim 3, wherein said switching means is provided in the vicinity of the end of said suction duct, and the switching mode of said switching means alters when said suction duct begins to be inserted into said guide duct.

* * * * *